US009276633B2

(12) United States Patent
Chen et al.

(10) Patent No.: US 9,276,633 B2
(45) Date of Patent: Mar. 1, 2016

(54) POWER LINE COMMUNICATION CONTROL SYSTEM ADAPTED FOR SINGLE-WIRE AND METHOD THEREOF

(71) Applicant: NATIONAL FORMOSA UNIVERSITY, Huwei Township, Yunlin County (TW)

(72) Inventors: Yu-Kai Chen, Huwei Township (TW); Chin-Hsiung Chang, Huwei Township (TW)

(73) Assignee: NATIONAL FORMOSA UNIVERSITY, Huwei Township, Yunlin County (TW)

( * ) Notice: Subject to any disclaimer, the term of this patent is extended or adjusted under 35 U.S.C. 154(b) by 0 days.

(21) Appl. No.: 14/536,022

(22) Filed: Nov. 7, 2014

(65) Prior Publication Data

US 2015/0130598 A1   May 14, 2015

(30) Foreign Application Priority Data

Nov. 8, 2013   (TW) .............................. 102140724 U

(51) Int. Cl.
H04B 3/54   (2006.01)
(52) U.S. Cl.
CPC ........ *H04B 3/542* (2013.01); *H04B 2203/5412* (2013.01)
(58) Field of Classification Search
CPC ................. H04B 2203/5412; H04B 2203/542; H04B 2203/5437; H04B 2203/5475; H04B 2203/5479
See application file for complete search history.

(56) References Cited

U.S. PATENT DOCUMENTS

| 8,130,085 B2 * | 3/2012 | Noh ......................... | H04B 3/54 340/12.32 |
| 8,427,300 B2 * | 4/2013 | Covaro .................... | H03K 7/08 340/12.32 |
| 8,988,248 B2 * | 3/2015 | Beck ........................ | H04B 3/54 235/380 |

* cited by examiner

*Primary Examiner* — Mark Blouin
(74) *Attorney, Agent, or Firm* — Muncy, Geissler, Olds & Lowe, P.C.

(57) ABSTRACT

A power line communication control system adapted for single-wire and method thereof are provided in the present invention. The power line communication control method adapted for single-wire includes: receiving a AC voltage from a AC power wire, wherein each period of the AC voltage includes a positive half cycle and a negative half cycle to form a sinusoidal AC signal; and adjusting the positive half cycle and the negative half cycle of the sinusoidal AC signal according to a digital data to be transmit to a load circuit. The step of adjusting the positive half cycle and the negative half cycle of the sinusoidal AC signal includes removing a first component of the positive half cycle of the sinusoidal AC signal and a second component of the negative half cycle of the sinusoidal AC signal to obtain a phase cutting signal. When the digital data is a first logic, the positive half cycle of the phase cutting signal is equal to the negative half cycle of the phase cutting signal. When the digital data is a second logic, the positive half cycle of the phase cutting signal is not equal to the negative half cycle of the phase cutting signal.

14 Claims, 12 Drawing Sheets

US 9,276,633 B2

POWER LINE COMMUNICATION CONTROL SYSTEM ADAPTED FOR SINGLE-WIRE AND METHOD THEREOF

This application claims priority of No. 102140724 filed in Taiwan R.O.C. on Nov. 8, 2013 under 35 USC 119, the entire content of which is hereby incorporated by reference.

BACKGROUND OF THE INVENTION

1. Field of Invention

The present invention relates to the technology of the transmission and determination of control signal, and more particularly to a power line communication control system adapted for single-wire and a method thereof.

2. Related Art

Lamp has already become an indispensable appliance in daily life. For house plan or home plan, lamp also plays an important role. The interface of the lamp-holder is generally configured on the wall or ceiling. The interface of the lamp-holder is not only used for disposing the lamp, such as wall lamp, chandelier, fluorescent lamp, but also for disposing ceiling fans or a ceiling fan with integrated light fixtures. Moreover, the lamp or the ceiling fans is with multi-level control function. FIG. 1 illustrates a circuit block diagram depicting a lamp with multi-level control function according to a conventional art. Referring to FIG. 1, the lamp with multi-level control function comprises a lamp switch 101, a multi-level control circuit 102, a fluorescent lamp 103 and a night light 104. The multi-level control circuit 102 is used for detecting number of times for turning on the lamp switch 101. At the first time that lamp switch 101 is turned on, the output terminal 10A outputs the AC voltage/current, and the output terminals 10B and 10C are high impedance. Thus, the fluorescent lamp 103 is turned on, and the night light 104 is kept in off state. When the lamp switch is turned on second time, the output terminal 10B outputs the AC voltage/current, and the output terminals 10A and 10C are high impedance. Thus, the fluorescent lamp 103 is turned off, and the night light 104 is turned on. When the lamp switch is turned on third time, the output terminal 10C outputs the AC voltage/current, and the output terminals 10A and 10B are high impedance. Thus, the fluorescent lamp 103 and the night light are turned on at the same time.

However, the disadvantage of the multi-level control lamp is that user must turn off and then turn on the lamp switch 101 to switch the levels. The method for switching the levels would cause interruption of the AC current/voltage repeatedly, and the lamps would be first extinguished then be lit. If user mis-operates the lamp switch 101, user has to perform to turn on and off the lamp switch 101 more times. Another level switching method is to set a drawstring on the lamp or the ceiling fan, and the levels controlling is by whether the drawstring is pulled or not. However, to set a drawstring on the lamp or the ceiling fan should consider whether user can pull the drawstring or not. Moreover, the drawstring in a living room may block the sight.

According to the issues arising from the above-mentioned prior art, industry also propose a solution now. FIG. 2 illustrates a wiring diagram depicting a lamp with multi-level control function according to a conventional art. Referring to FIG. 2, the wiring diagram of the lamp includes a live wire L, a neutral wire N, a lamp 201, a wall lamp line 202, a lamp switch SW, an interface circuit 204 and a control line 203. User can switch the levels of the lamp 201 through the interface circuit 204 and the control line 203. However, people having ordinary skill in the art should know that the extra control line 203 should be configured in the wall in order to install the interface circuit 204. This wiring configuration is more complex. Also, the interface circuit 204 coupled to the control line 203 belongs to weak current circuit. If the control line 203 is configured with the wall lamp line 202, it may have doubts about security.

The other solution is to use a wireless control method. The method can reduce the wiring. However, an extra wireless signal transmitter is required, and the lamp needs a wireless signal receiver as well. This design causes high price of the lamp.

SUMMARY OF THE INVENTION

It is therefore an objective of the present invention to provide a power line communication control method and a power line communication control system adapted for single-wire to perform power management by digital transmission.

Another object of the present invention is to provide a power line communication control method and a power line communication control system adapted for single-wire to control the levels of the load on the lamp interface by user without increasing the extra wiring and without switching the light switch.

To achieve the above-identified or other objectives, the present invention provides one power line communication control method. The power line communication control method comprises: receiving a AC voltage from a power line, wherein each period of the AC voltage comprises a positive half cycle and a negative half cycle which form a sinusoidal AC signal; and adjusting the positive half cycle and the negative half cycle of the sinusoidal AC signal according to a digital data to be transmitted to a load circuit. The step of adjusting the positive half cycle and the negative half cycle of the sinusoidal AC signal comprises: 1. setting a waveform similarity threshold; 2. chopping the positive half cycle and the negative half cycle of the sinusoidal AC signal to obtain a phase chopping signal. When the digital data is a first logic, an on-time of the positive half cycle of the phase chopping signal plus an on-time of the negative half cycle of the phase chopping signal is greater than the waveform similarity threshold. When the digital data is a second logic, the on-time of the positive half cycle of the phase chopping signal plus the on-time of the negative half cycle of the phase chopping signal is smaller than the waveform similarity threshold.

In the power line communication control method of a preferred embodiment of the present invention, the waveform similarity threshold is 90% of a period of the sinusoidal AC signal. The phase chopping signal represents the first logic when the on-time of the positive half cycle of the phase chopping signal plus the on-time of the negative half cycle of the phase chopping signal is greater than 90% of the period of the sinusoidal AC signal. The phase chopping signal represents the second logic when the on-time of the positive half cycle of the phase chopping signal plus the on-time of the negative half cycle of the phase chopping signal is smaller than 90% of the period of the sinusoidal AC signal.

Another power line communication control method is provided in the present invention. The power line communication control method comprises: receiving a AC voltage from a power line, wherein each period of the AC voltage comprises a positive half cycle and a negative half cycle which form a sinusoidal AC signal; and adjusting the positive half cycle and the negative half cycle of the sinusoidal AC signal according to a digital data to be transmitted to a load circuit. The step of adjusting the positive half cycle and the negative half cycle of the sinusoidal AC signal comprises chopping the positive half cycle and the negative half cycle of the sinusoidal AC signal to obtain a phase chopping signal. When the digital data is a first logic, an on-time of the positive half cycle of the phase chopping signal is equal to an on-time of the negative half cycle of the phase chopping signal. When the digital data is a second logic, the on-time of the positive half cycle of the phase chopping signal is not equal to the on-time of the negative half cycle of the phase chopping signal.

The other power line communication control method is provided in the present invention. The power line communication control method comprises: receiving a AC voltage from a power line, wherein each period of the AC voltage comprises a positive half cycle and a negative half cycle which form a sinusoidal AC signal; and adjusting the positive half cycle and the negative half cycle of the sinusoidal AC signal according to a digital data to be transmitted to a load circuit. When the digital data is a first logic, a component of the positive half cycle of the sinusoidal AC signal is chopped, and the negative half cycle of the sinusoidal AC signal is unchanged to obtain the phase chopping signal. When the digital data is a second logic, a component of the negative half cycle of the sinusoidal AC signal is chopped, and the positive half cycle of the sinusoidal AC signal is unchanged to obtain the phase chopping signal.

According to the first power line communication control method provided in the present invention, the power line communication control system, adapted for single-wire, coupled between a first AC terminal and a second AC terminal, for receiving a sinusoidal AC signal from the first AC terminal and changing a positive half cycle and a negative half cycle of the sinusoidal AC signal to obtain a phase chopping signal according to a user's operation. The power line communication control system comprises a load circuit and a signal chopping circuit. The load circuit receives the phase chopping signal, for determining a logic according to a positive half cycle and a negative half cycle of the phase chopping signal. The signal chopping circuit is coupled to the first AC terminal, the second AC terminal and the load circuit for adjusting the positive half cycle and the negative half cycle of the sinusoidal AC signal according to a digital data to be transmitted to the load circuit. The signal chopping circuit is used for chopping the positive half cycle and the negative half cycle of the sinusoidal AC signal to obtain the phase chopping signal, wherein an off time of the positive half cycle of the phase chopping signal is equal to an off time of the negative half cycle of the phase chopping signal when the digital data is a first logic, wherein the off time of the positive half cycle of the phase chopping signal is not equal to the off time of the negative half cycle of the phase chopping signal when the digital data is a second logic.

According to the second power line communication control method provided in the present invention, the power line communication control system, adapted for single-wire, coupled between a first AC terminal and a second AC terminal, for receiving a sinusoidal AC signal from the first AC terminal and changing a positive half cycle and a negative half cycle of the sinusoidal AC signal to obtain a phase chopping signal according to a user's operation. The power line communication control system comprises a load circuit and a signal chopping circuit. The load circuit receives the phase chopping signal, for determining a logic according to a positive half cycle and a negative half cycle of the phase chopping signal. The signal chopping circuit is coupled to the first AC terminal, the second AC terminal and the load circuit, wherein the signal chopping circuit adjusts the positive half cycle and the negative half cycle of the sinusoidal AC signal according to a digital data to be transmitted to the load circuit to obtain the phase chopping signal. When the digital data is a first logic, a sum of an on-time of the positive half cycle of the phase chopping signal and an on-time of the negative half cycle of the phase chopping signal are greater than a waveform similarity threshold. When the digital data is a second logic, the sum of the on-time of the positive half cycle of the phase chopping signal and the on-time of the negative half cycle of the phase chopping signal are smaller than the waveform similarity threshold.

According to the third power line communication control method provided in the present invention, the power line communication control system, adapted for single-wire, coupled between a first AC terminal and a second AC terminal, for receiving a sinusoidal AC signal from the first AC terminal and changing a positive half cycle and a negative half cycle of the sinusoidal AC signal to obtain a phase chopping signal according to a user's operation. The power line communication control system comprises a load circuit and a signal chopping circuit. The load circuit receives the phase chopping signal, for determining a logic according to a positive half cycle and a negative half cycle of the phase chopping signal. The signal chopping circuit is coupled to the first AC terminal, the second AC terminal and the load circuit, wherein the signal chopping circuit adjusts the positive half cycle and the negative half cycle of the sinusoidal AC signal according to a digital data to be transmitted to the load circuit to obtain the phase chopping signal. When the digital data is a first logic, a component of the positive half cycle of the sinusoidal AC signal is chopped, and the negative half cycle of the sinusoidal AC signal is unchanged. When the digital data is a second logic, a component of the negative half cycle of the sinusoidal AC signal is chopped, and the positive half cycle of the sinusoidal AC signal is unchanged.

The spirit of the present invention is to utilize the AC signal on the AC power line to control the load circuit. The load circuit can determines whether the received AC signal represents the logic "1" or "0" according to the waveform of the AC signal. Therefore, the system is exempted from increasing wiring settings of extra control circuit between the load circuit and power source. Further, it is also exempted from the annoyance by switching the lamp switch for controlling of the levels of the load circuit.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention.

DETAILED DESCRIPTION OF THE INVENTION

The present invention will be apparent from the following detailed description, which proceeds with reference to the accompanying drawings, wherein the same references relate to the same elements.

Figure 1:
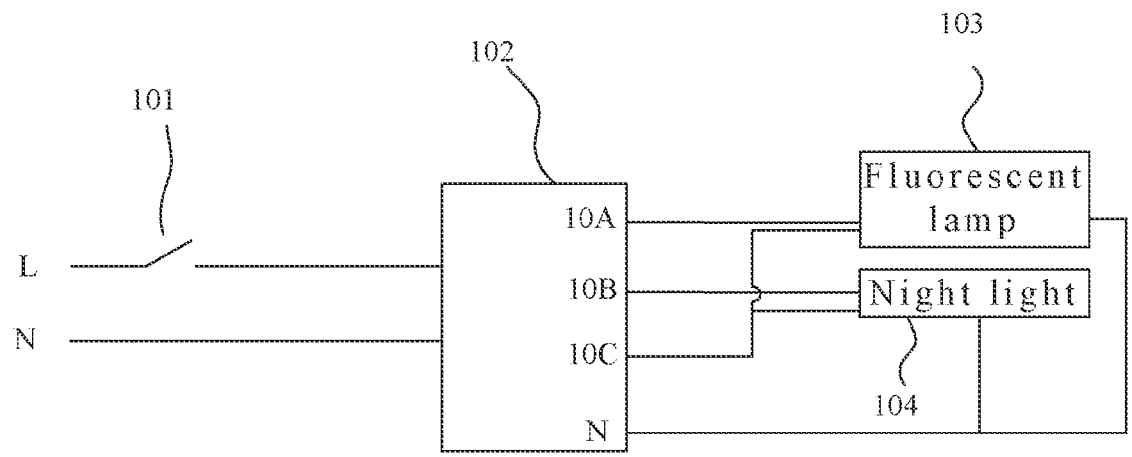
FIG. 1 illustrates a circuit block diagram depicting a lamp with multi-level control function according to a conventional art.
Figure 2:
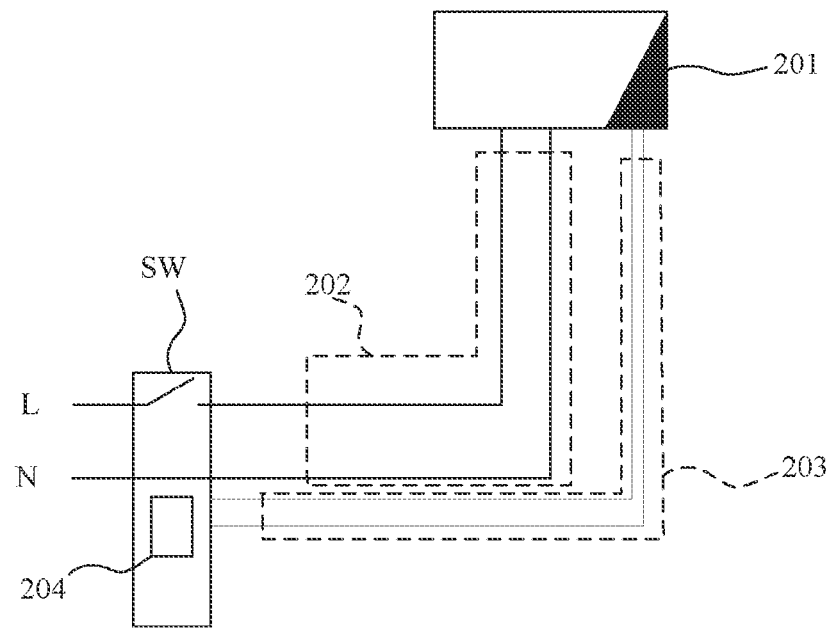
FIG. 2 illustrates a wiring diagram depicting a lamp with multi-level control function according to a conventional art.
Figure 3:
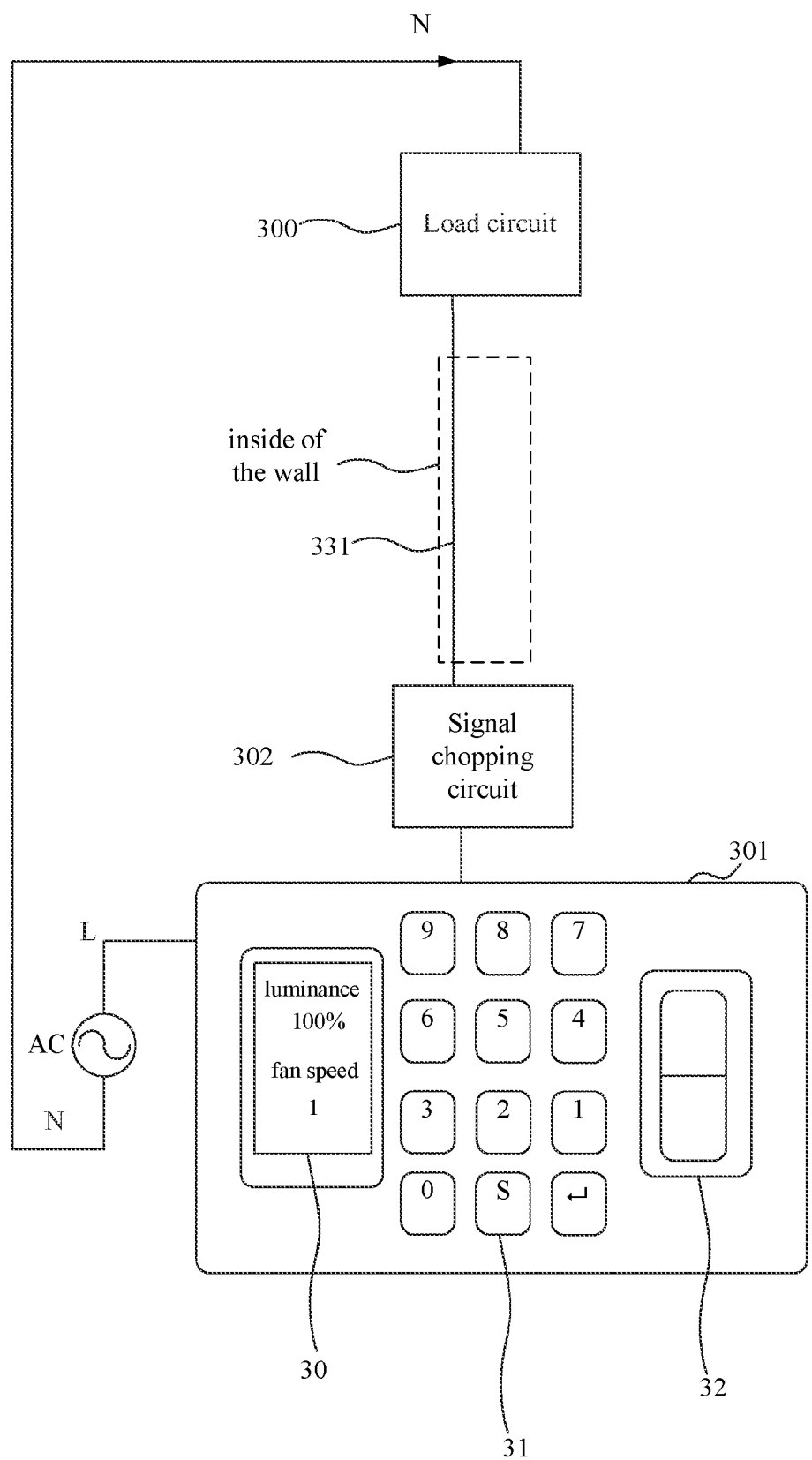
FIG. 3 illustrates a circuit diagram depicting a power line communication control system according to a preferred embodiment of the present invention.

FIG. 3 illustrates a circuit diagram depicting a power line communication control system according to a preferred embodiment of the present invention. Referring to FIG. 3, the power line communication control system includes a load circuit 300, a control interface 301 and a signal chopping circuit 302. The load circuit 300 is disposed on a lamp interface on the wall or the ceiling. Generally speaking, the load circuit 300 may be a lamp, a ceiling fan or a ceiling fan with integrated light fixtures. The load circuit 300 is coupled to the lamp connection line 331 of the lamp interface to receive the AC from the lamp connection line 331. The control interface 301 and the signal chopping circuit 302 are generally disposed on the position disposing the lamp switch.

In this embodiment, the control interface 301 includes a liquid crystal display (LCD) 30, a numeric keypad 31 and a lamp switch 32. The lamp switch is used for turning the load circuit on or off. The LCD 30 is used for displaying the status of the load circuit 300. The numeric keypad 31 is used for controlling the phase chopping signal outputted from the signal chopping circuit 302. For example, assuming that the load circuit 300 is a ceiling fan with integrated light fixtures, and strength levels of air flowed from the ceiling fan of the load circuit 300 is controllable, and luminance levels of the lamp of the load circuit 300 is also controllable. User can controls the strength levels of the ceiling fan and the luminance level of the lamp through the numeric keypad 31 of the control interface 301.

Figure 4:
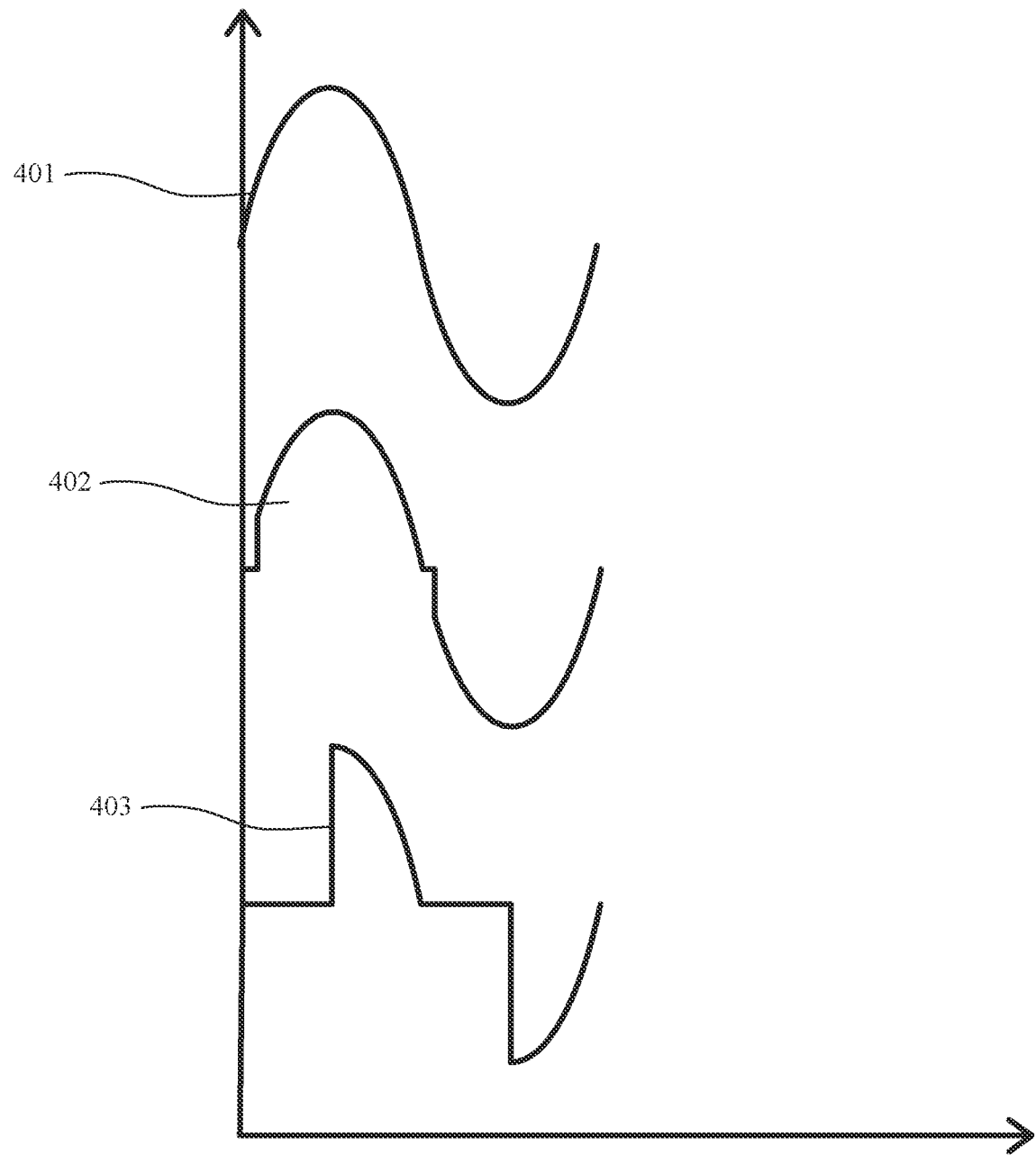
FIG. 4 illustrates a waveform diagram depicting an operation of the power line communication control system according to a preferred embodiment of the present invention.

FIG. 4 illustrates a waveform diagram depicting an operation of the power line communication control system according to a preferred embodiment of the present invention. Referring to FIG. 4, the digital control method is a comparatively convenient and ideal way in the abovementioned methods. In addition, for safety, in this embodiment, no extra wiring for controlling is required. Thus, in this embodiment, the digital data is represented by the voltage difference between the voltage of the lamp connection line 331 and a reference common voltage (ground reference), that is, the phase chopping signal is the voltage difference. The label 401 represents the waveform depicting the voltage difference between the voltage of the lamp connection line 331 and the reference common voltage in a normal power transmission; the label 402 represents the waveform depicting the voltage difference between the voltage of the lamp connection line 331 and the reference common voltage when the signal chopping circuit 302 outputs a logic "1"; the label 403 represents the waveform depicting the voltage difference between the voltage of the lamp connection line 331 and the reference common voltage when the signal chopping circuit 302 outputs a logic "0".

According to the abovementioned embodiment, when the signal chopping circuit 302 outputs the logic "1", the positive half cycle and the negative half cycle of the voltage difference between the voltage of the lamp connection line 331 and the reference common voltage are slightly chopped; when the signal chopping circuit 302 outputs the logic "0, the positive half cycle and the negative half cycle of the voltage difference between the voltage of the lamp connection line 331 and the reference common voltage are greatly chopped. If the load circuit 300 detects the on time of the positive half cycle and the on time of the negative half cycle of the phase chopping signal, the load circuit 300 can determine which the received phase chopping signal represents the logic "1", the logic "0" or the general AC.

Figure 5:
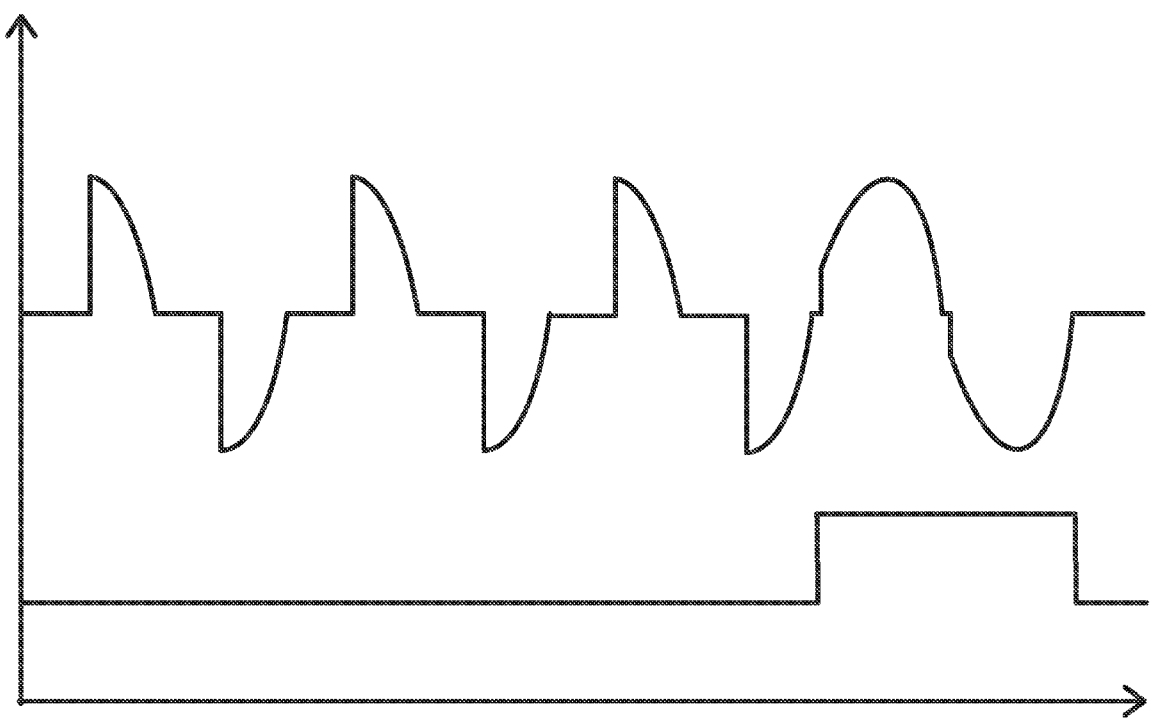
FIG. 5 illustrates a waveform diagram depicting an operation of the power line communication control system according to a preferred embodiment of the present invention.

Generally speaking, the load circuit 300 would have a logic determination threshold (waveform similarity threshold). For example, as the 110V AC in Taiwan, the period of AC voltage is 16.67 ms. The threshold may be 90% of 16.67 ms. When the phase chopping signal (or AC voltage) is received, the on-time of the positive half cycle plus the on-time of the negative half cycle is equal to 16.67 ms, it is determined that the received phase chopping signal is a general AC. When the on-time of the positive half cycle plus the on-time of the negative half cycle is larger than 15 ms (16.67×90%) and less than 16.67 ms, it is determined that the received phase chopping signal represents a logic "1". Similarly, when the on-time of the positive half cycle plus the on-time of the negative half cycle is smaller than 15 ms (16.67×90%), it is determined that the received phase chopping signal represents a logic "0". FIG. 5 illustrates a waveform diagram depicting an operation of the power line communication control system according to a preferred embodiment of the present invention. Referring to FIG. 5, assuming the digital data to be transmitted from the signal chopping circuit 302 to the load circuit 300 is "0001" according to a user's operation, the phase chopping signal received by the load circuit 300 is shown in FIG. 5.

According to the abovementioned embodiment, people having ordinary skill in the art should know that the signal chopping circuit and the load circuit can be connected by two wired (live wire and neutral wire) or connected by single wire (live wire) for data transmission or controlling the lamp or apparatus on a wall or a ceiling.

Figure 6:
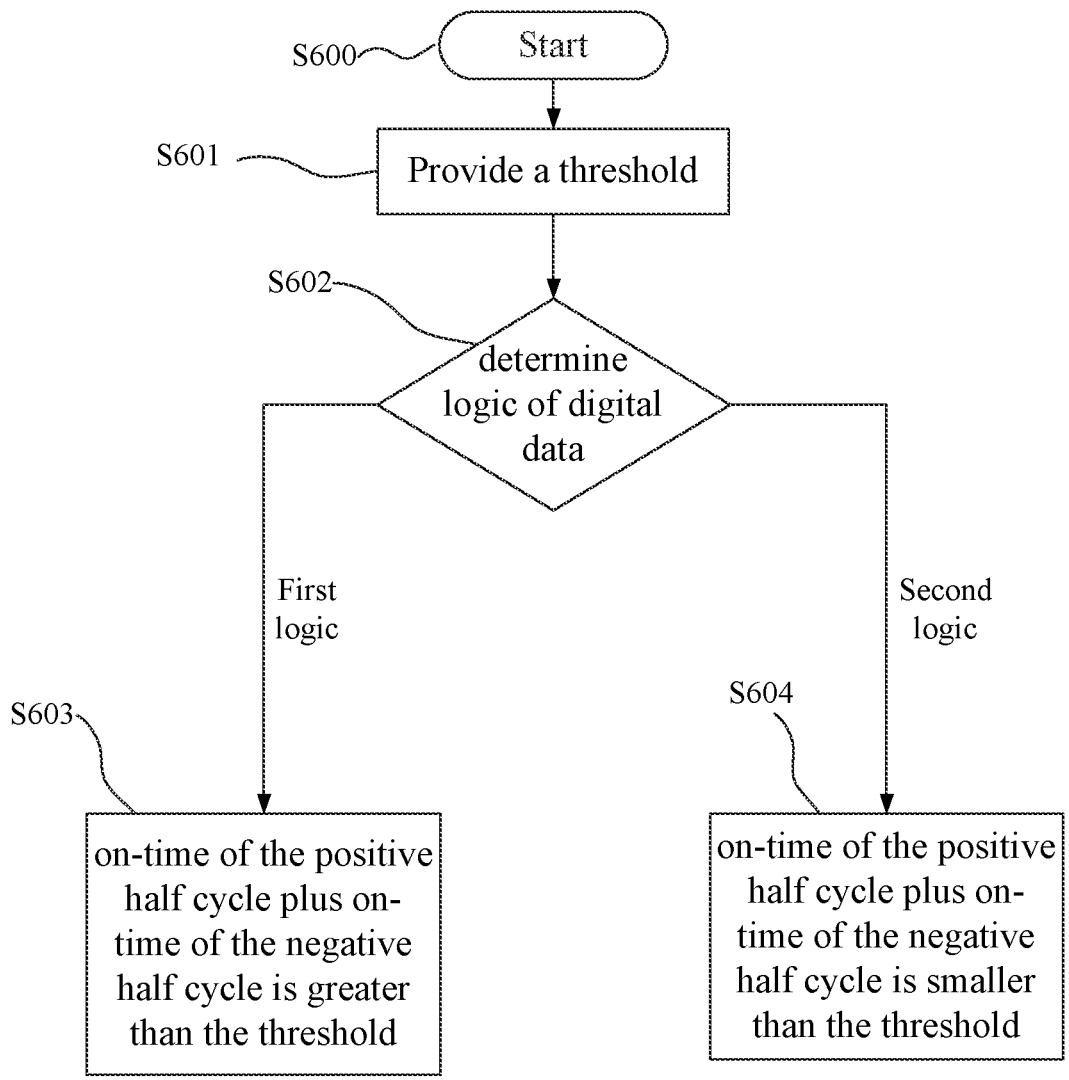
FIG. 6 illustrates a flowchart depicting a power line communication control method according to a preferred embodiment of the present invention.

According to the abovementioned embodiment, it can be summarized as a power line communication control method adapted for single-wire. FIG. 6 illustrates a flowchart depicting a power line communication control method according to a preferred embodiment of the present invention. Referring to FIG. 6, the method includes the steps as follow.

In step S600, the method starts.

In step S601, a logic determination threshold is provided.

In step S602, it is determined whether a data to be transmitted to the load circuit is a first logic or a second logic. When the data is the first logic, the step S603 is performed. When the data is the second logic, the step S604 is performed.

In step S603, the AC signal is chopped to obtain a phase chopping signal whose on-time of the positive half cycle plus on-time of the negative half cycle is greater than the logic determination threshold, when the data to be transmitted is the first logic.

In step S604, the AC signal is chopped to obtain a phase chopping signal whose on-time of the positive half cycle plus on-time of the negative half cycle is smaller than the logic determination threshold, when the data to be transmitted is the second logic.

In the abovementioned embodiment, the first logic is logic "1", and the second logic is logic "0" for example, people having ordinary skill in the art should know that the logic "1" and logic "0" can be changed according to the different design. Thus, the present invention is not limited thereto. Moreover, in the abovementioned embodiment, the logic determination threshold is 90% of the AC period for example, people having ordinary skill in the art should know that the threshold can be also changed according to different design. Thus, the present invention is not limited thereto.

Figure 7:
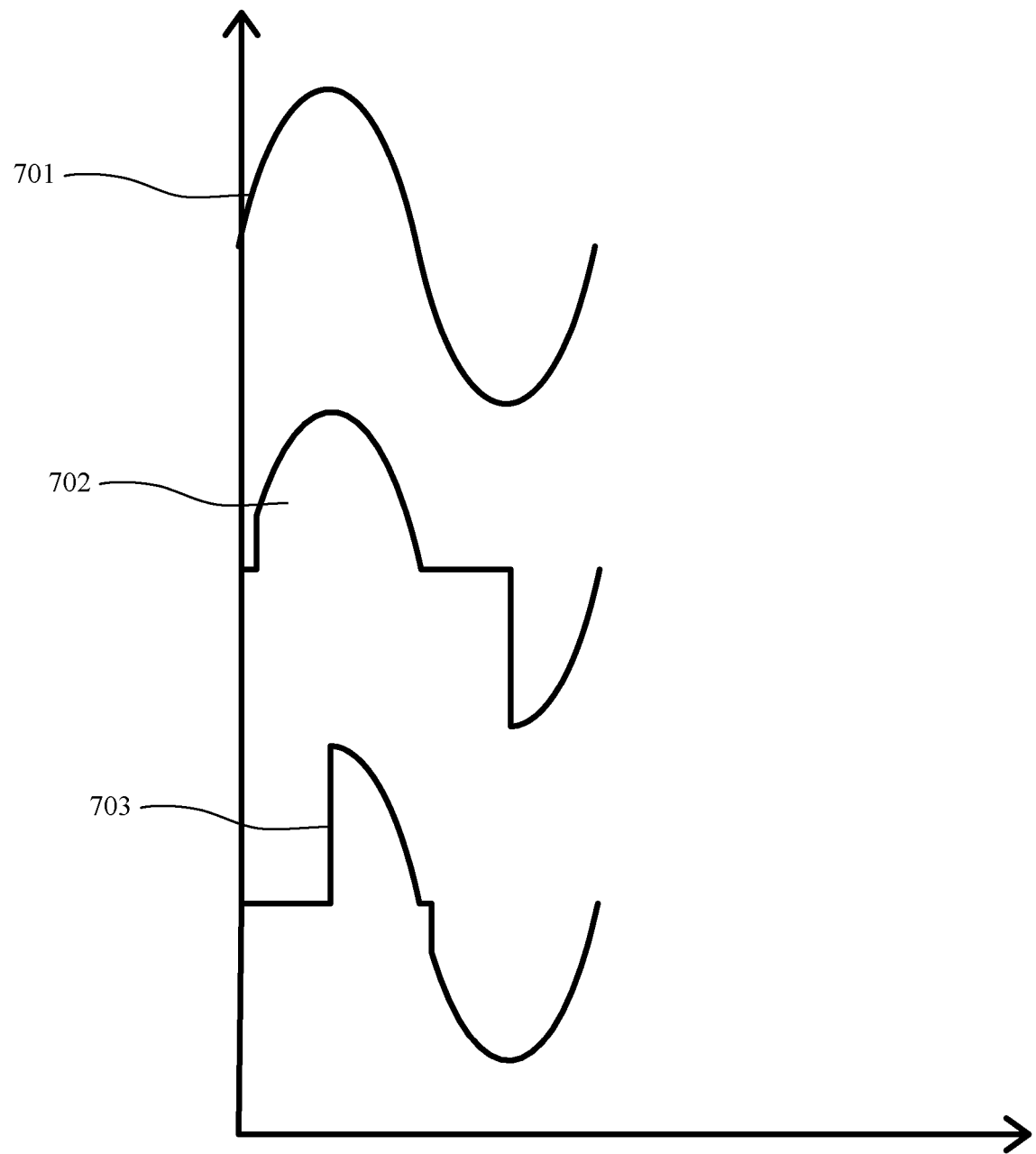
FIG. 7 illustrates a waveform diagram depicting an operation of the power line communication control system according to a preferred embodiment of the present invention.

FIG. 7 illustrates a waveform diagram depicting an operation of the power line communication control system according to a preferred embodiment of the present invention. Referring to FIG. 7, similarly, the circuitry also adopts the circuit in FIG. 3 for example, however, the operation is slightly different. In this embodiment, the voltage difference between the voltage of the lamp connection line 331 and a reference common voltage is adopted for representing a digital data, that is, the phase chopping signal is the voltage difference. The label 701 represents the waveform depicting the voltage difference between the voltage of the lamp connection line 331 and the reference common voltage in a normal power transmission; the label 702 represents the waveform depicting the voltage difference between the voltage of the lamp connection line 331 and the reference common voltage when the signal chopping circuit 302 outputs a logic "1"; the label 703 represents the waveform depicting the voltage difference between the voltage of the lamp connection line 331 and the reference common voltage when the signal chopping circuit 302 outputs a logic "0".

According to the abovementioned embodiment, when the signal chopping circuit 302 outputs a logic "1", the positive half cycle of the voltage difference between the voltage of the lamp connection line 331 and the reference common voltage would be slightly chopped, but the negative half cycle of the voltage difference between the voltage of the lamp connection line 331 and the reference common voltage would be substantially chopped. When the signal chopping circuit 302 outputs a logic "0", the positive half cycle of the voltage between difference the voltage of the lamp connection line 331 and the reference common voltage would be substantially chopped, but the negative half cycle of the voltage difference between the voltage of the lamp connection line 331 and the reference common voltage would be slightly chopped. If the load circuit 300 compares the on-time of the positive half cycle of the phase chopping signal with the on time of the negative half cycle of the phase chopping signal, the load circuit 300 can determine which the received phase chopping signal represents the logic "1", the logic "0" or the general AC.

Figure 8:
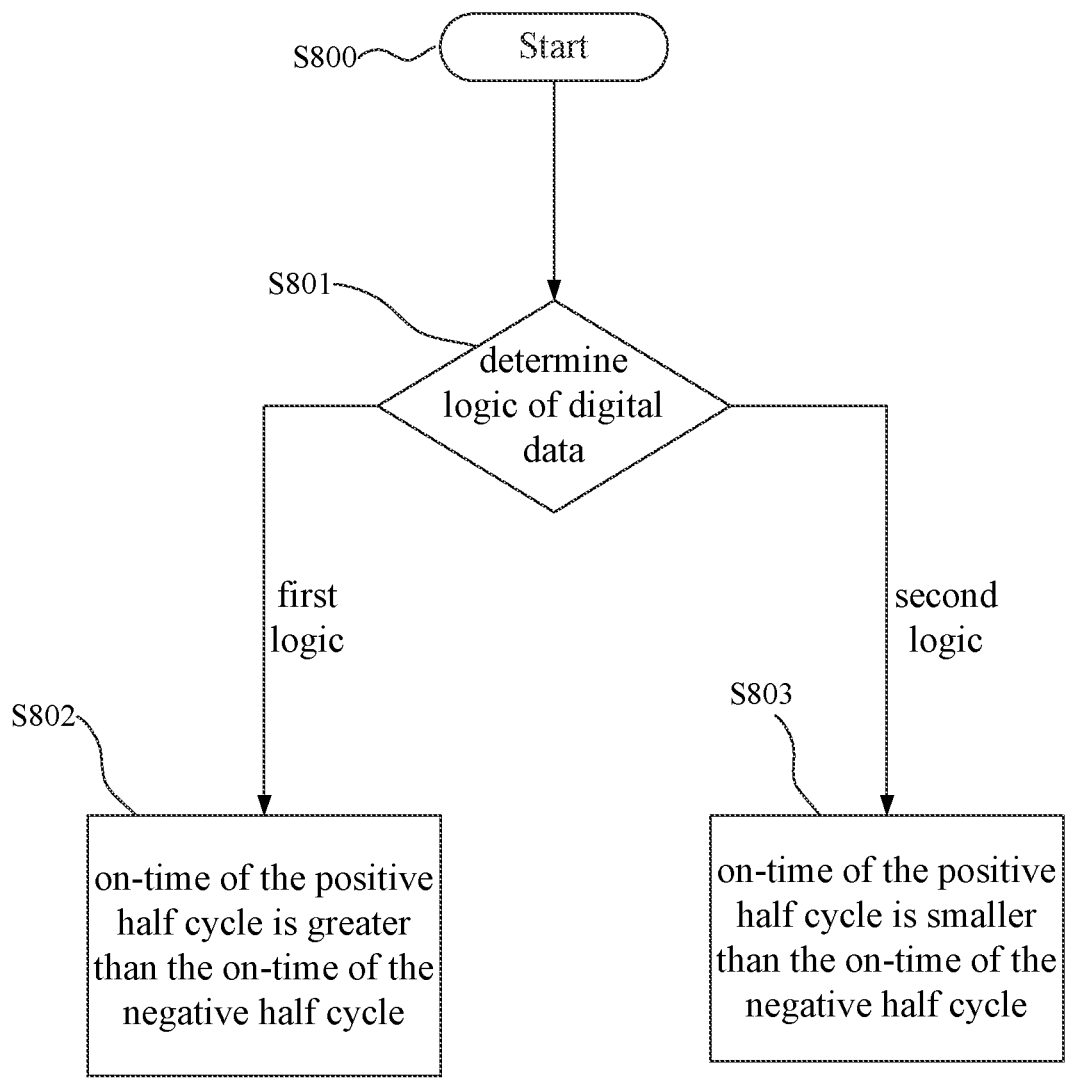
FIG. 8 illustrates a flowchart depicting a power line communication control method according to a preferred embodiment of the present invention.

Similarly, according to the abovementioned embodiment, it can be summarized as a power line communication control method adapted for single-wire. FIG. 8 illustrates a flowchart depicting a power line communication control method according to a preferred embodiment of the present invention. Referring to FIG. 8, the method includes the step as follow.

In step S800, the method starts.

In step S801, it is determined whether a data to be transmitted to the load circuit is a first logic or a second logic. When the data is the first logic, the step S802 is performed. When the data is the second logic, the step S803 is performed.

In step S802, the AC signal is chopped to obtain a phase chopping signal whose on-time of the positive half cycle is greater than the on-time of the negative half cycle, when the data to be transmitted is the first logic.

In step S803, the AC signal is chopped to obtain a phase chopping signal whose on-time of the positive half cycle is smaller than the on-time of the negative half cycle, when the data to be transmitted is the second logic.

Figure 9:
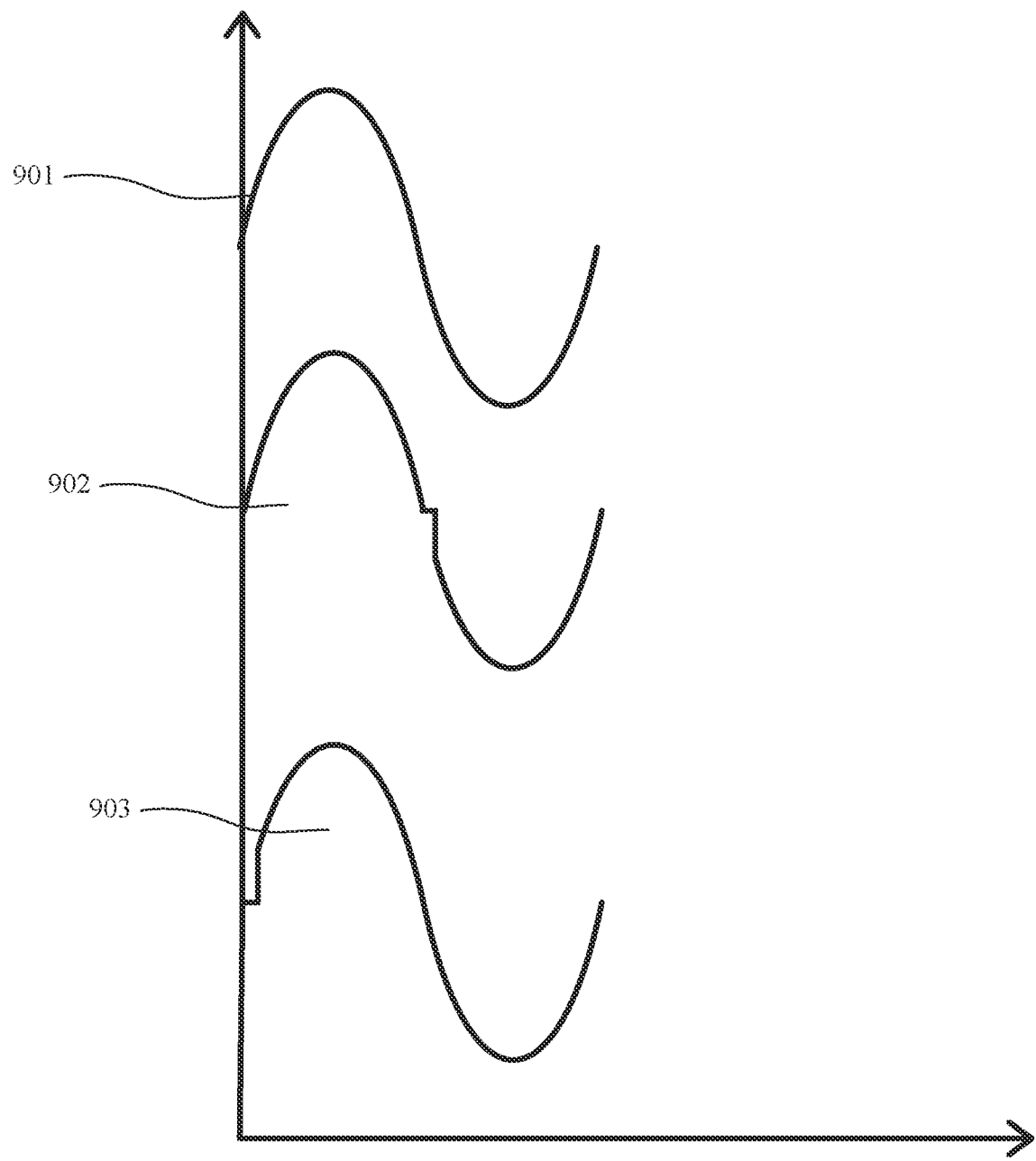
FIG. 9 illustrates a waveform diagram depicting an operation of the power line communication control system according to a preferred embodiment of the present invention.

FIG. 9 illustrates a waveform diagram depicting an operation of the power line communication control system according to a preferred embodiment of the present invention. Referring to FIG. 9, similarly, the circuitry also adopts the circuit in FIG. 3 for example, however, the operation is slightly different. In this embodiment, the voltage difference between the voltage of the lamp connection line 331 and a reference common voltage is adopted for representing a digital data, that is, the phase chopping signal is the voltage difference. The label 901 represents the waveform depicting the voltage difference between the voltage of the lamp connection line 331 and the reference common voltage in a normal power transmission; the label 902 represents the waveform depicting the voltage difference between the voltage of the lamp connection line 331 and the reference common voltage when the signal chopping circuit 302 outputs a logic "1"; the label 903 represents the waveform depicting the voltage difference between the voltage of the lamp connection line 331 and the reference common voltage when the signal chopping circuit 302 outputs a logic "0".

According to the abovementioned embodiment, when the signal chopping circuit 302 outputs a logic "1", the negative half cycle of the voltage difference between the voltage of the lamp connection line 331 and the reference common voltage would be slightly chopped, but the positive half cycle of the voltage difference between the voltage of the lamp connection line 331 and the reference common voltage is intact. When the signal chopping circuit 302 outputs a logic "0", the positive half cycle of the voltage difference between the voltage of the lamp connection line 331 and the reference common voltage would be slightly chopped, but the negative half cycle of the voltage difference between the voltage of the lamp connection line 331 and the reference common voltage is intact. Similarly, if the load circuit 300 compares the on-time of the positive half cycle of the phase chopping signal with the on time of the negative half cycle of the phase chopping signal, the load circuit 300 can determine which the received phase chopping signal represents the logic "1", the logic "0" or the general AC.

Figure 10:
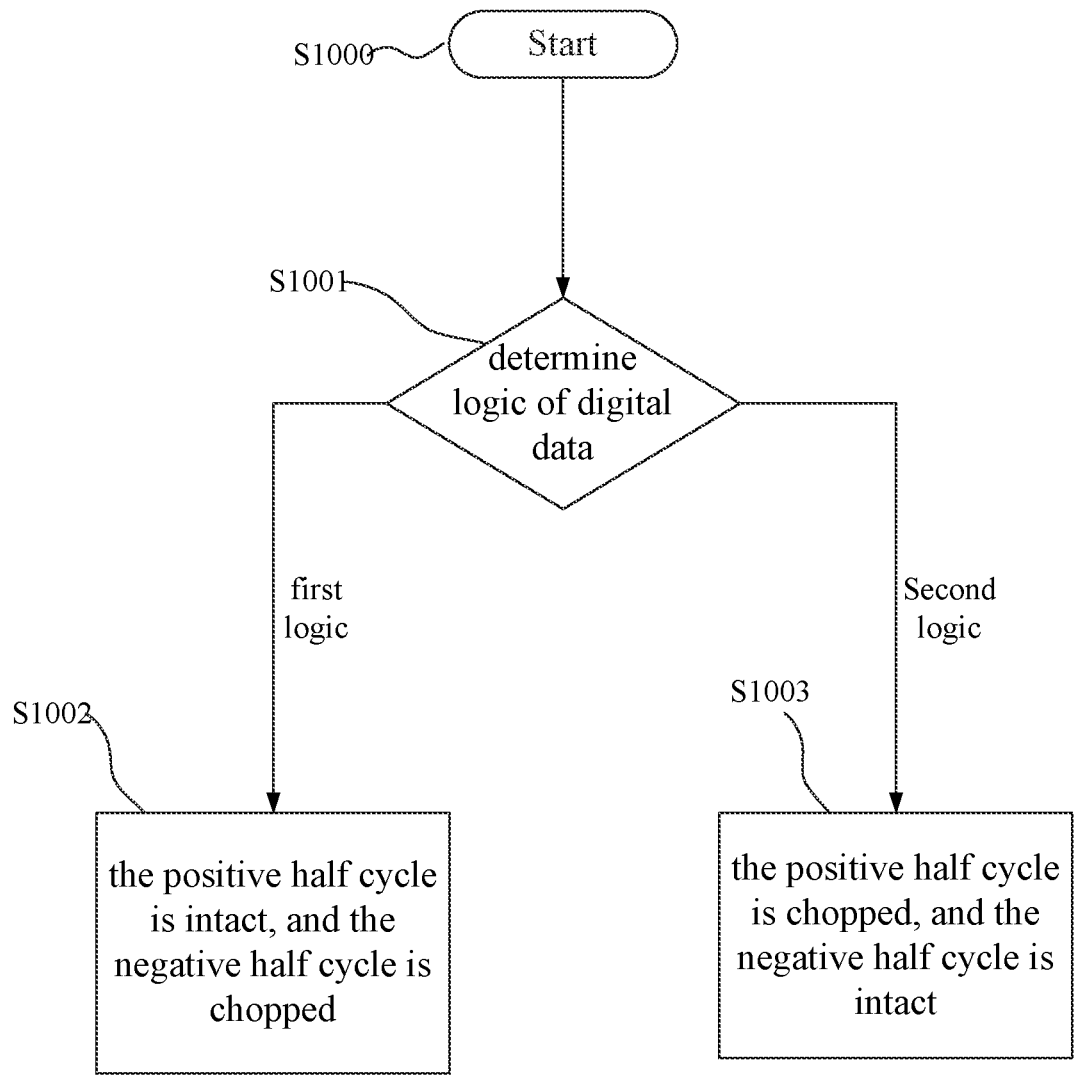
FIG. 10 illustrates a flowchart depicting a power line communication control method according to a preferred embodiment of the present invention.

Similarly, according to the abovementioned embodiment, it can be summarized as a power line communication control method adapted for single-wire. FIG. 10 illustrates a flowchart depicting a power line communication control method according to a preferred embodiment of the present invention. Referring to FIG. 10, the method includes the steps as follow.

In step S1000, the method starts.

In step S1001, it is determined whether a data to be transmitted to the load circuit is a first logic or a second logic. When the data is the first logic, the step S1002 is performed. When the data is the second logic, the step S1003 is performed.

In step S1002, the AC signal is chopped to obtain a phase chopping signal whose the negative half cycle is slightly chopped, when the data to be transmitted is the first logic, wherein the positive half cycle thereof is intact.

In step S1003, the AC signal is chopped to obtain a phase chopping signal whose the positive half cycle is slightly chopped, when the data to be transmitted is the second logic, wherein the negative half cycle thereof is intact.

Figure 11:
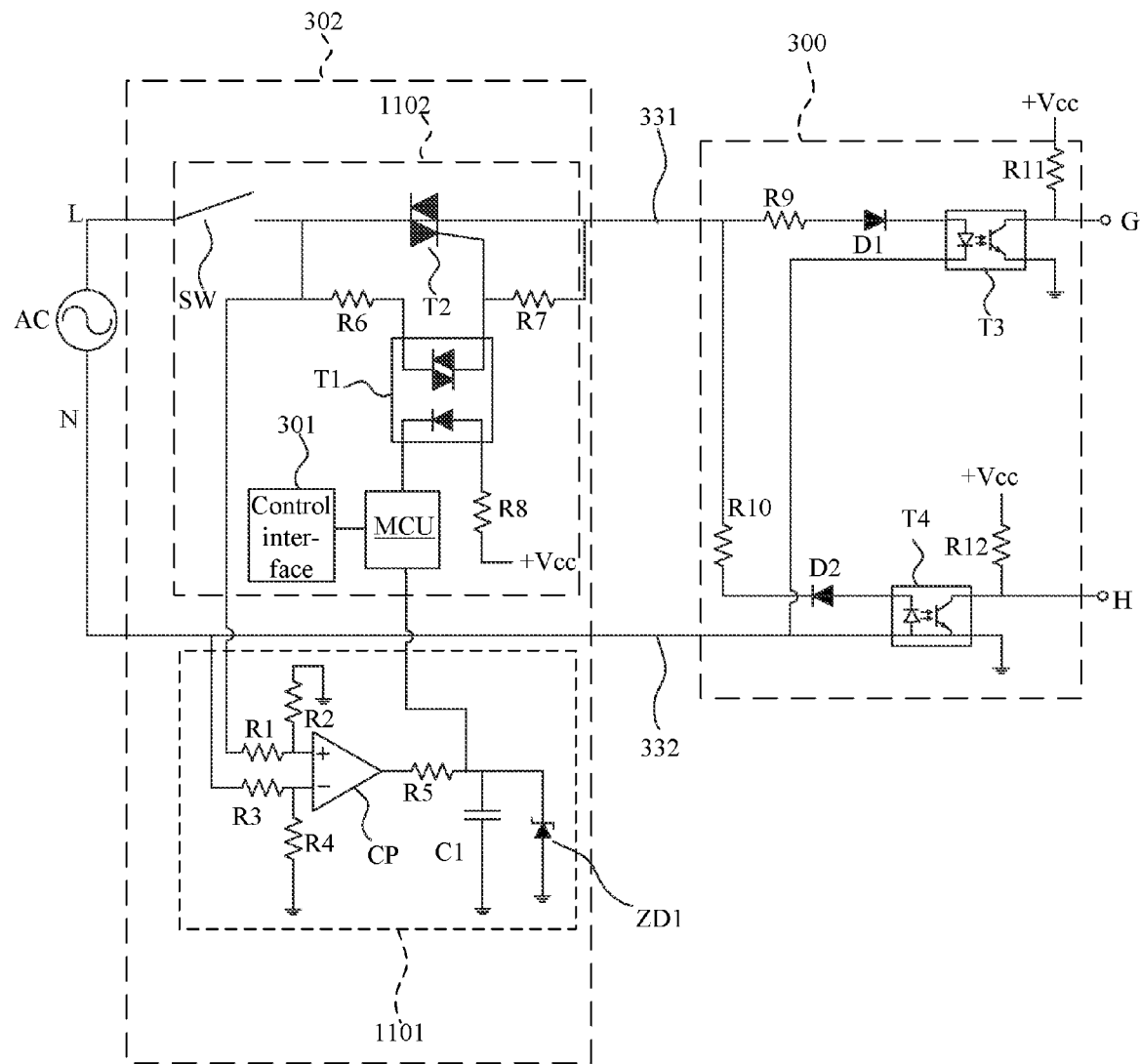
FIG. 11 illustrates a detail circuit diagram depicting the control interface 301, the signal chopping circuit 302 and a part of load circuit 300 of the power line communication control system according to a preferred embodiment of the present invention.

FIG. 11 illustrates a detail circuit diagram depicting the control interface 301, the signal chopping circuit 302 and a part of load circuit 300 of the power line communication control system according to a preferred embodiment of the present invention. Referring to FIG. 11, the signal chopping circuit 302 includes an AC period detector 1101 and a phase cutting circuit 1102. The AC period detector 1101 is implemented by resistors R1~R5, a capacitor C1, a zener diode ZD1 and a comparator (amplifier) CP. The resistors R1 and R2 are used for dividing the voltage of the live wire L. The resistors R3 and R4 are used for dividing the voltage of the neutral wire N. The resistor R5 and the capacitor C1 are used for filtering the output signal of the output terminal of the comparator (amplifier) CP. The zener diode ZD1 is served as a voltage limiter circuit, for limiting the output voltage of the comparator CP. The output voltage of the comparator CP is a square wave. The phase and the period of the square wave is the same as the phase and the period of the AC signal.

The phase cutting circuit 1102 includes a switch SW, a microprocessor MCU, resistors R6~R8, a photo-coupler T1 and a Tri-Electrode AC (TRIAC) Switch T2. The resistor R6 and R7 is used for current limitation. The resistor R8 is served as a pull high resistor. The microprocessor MCU receives the square wave outputted from the comparator CP. Since the general microprocessor MCU has PWM function, the microprocessor MCU could calculate the period and the phase of the AC signal according to the square wave outputted from the comparator CP. The control interface 301 may be a liquid crystal display 30 with numeric keypad. User can control the load levels of the load circuit through the control interface 301. When a user performs an operation through the control interface 301, the microprocessor MCU would output a control pulse to the photo-coupler T1 according to the period and phase of the AC voltage and user's operation (Referring to FIGS. 1 to 10 and their corresponding embodiment). When the photo-coupler T1 receives the control pulse with logic low voltage, the diode AC switch (DIAC) of the photo-coupler T1 would be triggered such that the DIAC is turned on. Thus, the TRIAC switch T2 is also triggered and then turned on.

The load circuit 300 includes resistors R9~R12, diodes D1 and D2 and photo-couplers T3 and T4. The resistor R9 and R10 are served as current limiting resistors for respectively limiting the currents flowing through the photo-couplers T3 and T4. The diode D1 and D2 are used for respectively performing positive half-wave rectifier and the negative half-wave rectifier for the voltage between the lamp connection line 331 and the neutral wire N. The resistors R11 and R12 are served as the pull high resistors. When there is no current flowing through the photo-coupler T3 and T4, the node G and the node H are logic high voltage +Vcc. When the positive half cycle current flows through the photo-coupler T3, the collector and the emitter of the photo-coupler T3 is short circuit. Thus, the voltage of the node G is logic low voltage. When the negative half cycle current flows through the photo-coupler T4, the collector and the emitter of the photo-coupler T4 is short circuit. Thus, the voltage of the node H is logic low voltage.

According to the abovementioned embodiment, the voltage between the live wire L and the neutral wire N is chopped such that to transmit the digital data to the lamp is achieved. In other words, the abovementioned embodiment is two-wired (the live wire L and the neutral wire N) power line communication control circuit. However, people having ordinary skill in the art should know that if there is only single wire connected between the switch on the wall and the lamp, the abovementioned circuit can still work for single wire. In other words, the abovementioned three power line communication control methods and systems adapted for single wire can be also adapted for two-wired control. Thus, the present invention is not limited to single wire.

Figure 12:
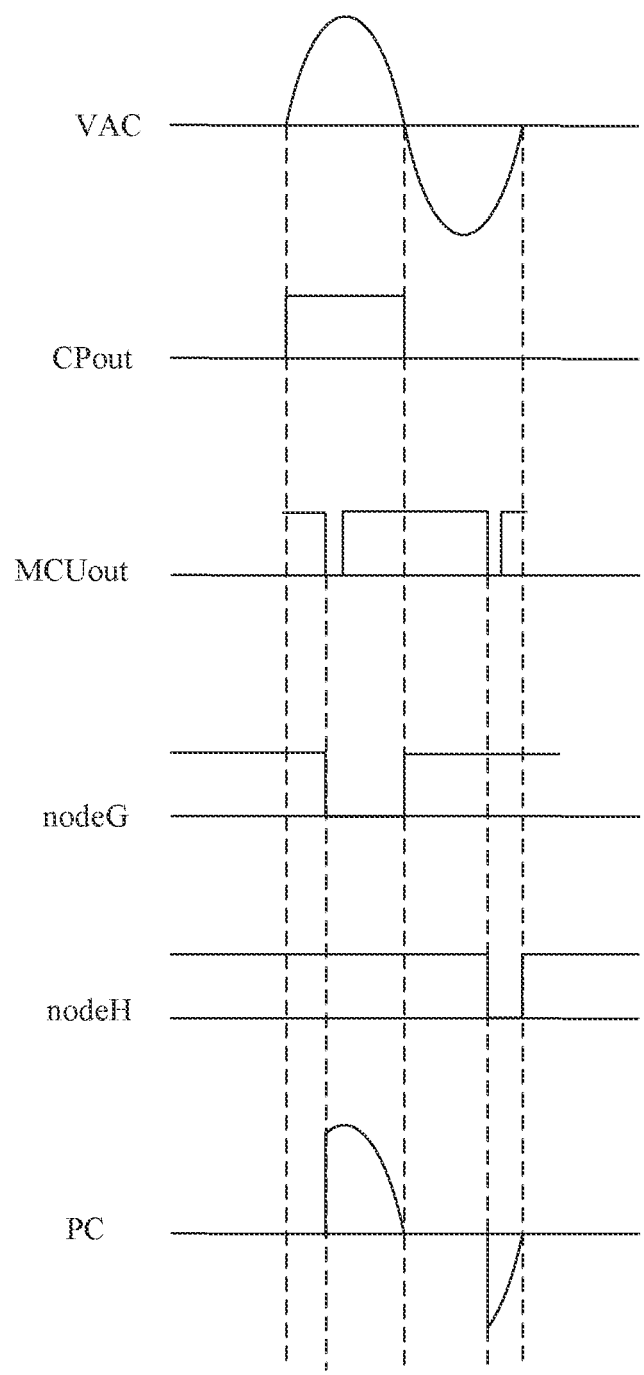
FIG. 12 illustrates a waveform diagram depicting the operations of the control interface 301, the signal chopping circuit 302 and a part of load circuit 300 of the power line communication control system according to a preferred embodiment of the present invention.

FIG. 12 illustrates a waveform diagram depicting the operations of the control interface 301, the signal chopping circuit 302 and a part of load circuit 300 of the power line communication control system according to a preferred embodiment of the present invention. Referring to FIG. 11 and FIG. 12, the label VAC represents a waveform of the AC voltage. The label CPout represents the square wave outputted from the comparator CP. The label MCUout represents the output wave of the microprocessor MCU. The label nodeG represents the waveform of the node G. The label node H represents the waveform of the node H. The label PC represents the waveform of the phase chopping signal. Taking the first embodiment as an example, when a user adjust the luminance or fan speed through the control panel PL, the microprocessor MCU outputs the pulse MCUout according to the luminance or fan speed adjusted by user. The pulse triggers the TRIAC switch T2 through the photo-coupler T1 such that the TRIAC switch T2 outputs a phase chopping signal PC.

The resistor R9 of the load circuit 300 and the diode D1 perform the positive half wave rectifier to the voltage between the voltage of the lamp connection line 331 and the reference common voltage, and output the rectified voltage to the photo-coupler T3. Thus, the pulse width of the node G represents the on-time of the positive half cycle of the phase chopping signal PC. Similarly, the resistor R10 of the load circuit 201 and the diode D2 perform the negative half wave rectifier to the voltage between the voltage of the lamp connection line 331 and the reference common voltage, and output the rectified voltage to the photo-coupler T4. Thus, the pulse width of the node H represents the on-time of the negative half cycle of the phase chopping signal PC. The load circuit detects the pulse width of the node G and the pulse width of the node H to obtain the on-time of the positive half cycle and the on-time of the negative half cycle of the voltage of the first lamp connection line 331. Thus, the load circuit 300 determines whether the transmission digital data is logic "1" or logic "0" according to the on-time of the positive half cycle of the phase chopping signal PC and the on time of the negative half cycle of the phase chopping signal PC.

In the abovementioned embodiment, the control interface 301 is implemented by a numeric keypad 31 with LDC 30. People having ordinary skill in the art should know that the design of the control interface 301 can be selected by different designs, for example, the LCD may be replaced by a seven-segment display, or the numeric keypad may be replaced by a plus and minus buttons. Thus, the present invention is not limited to the implementation of the control interface 301.

Figure 13:
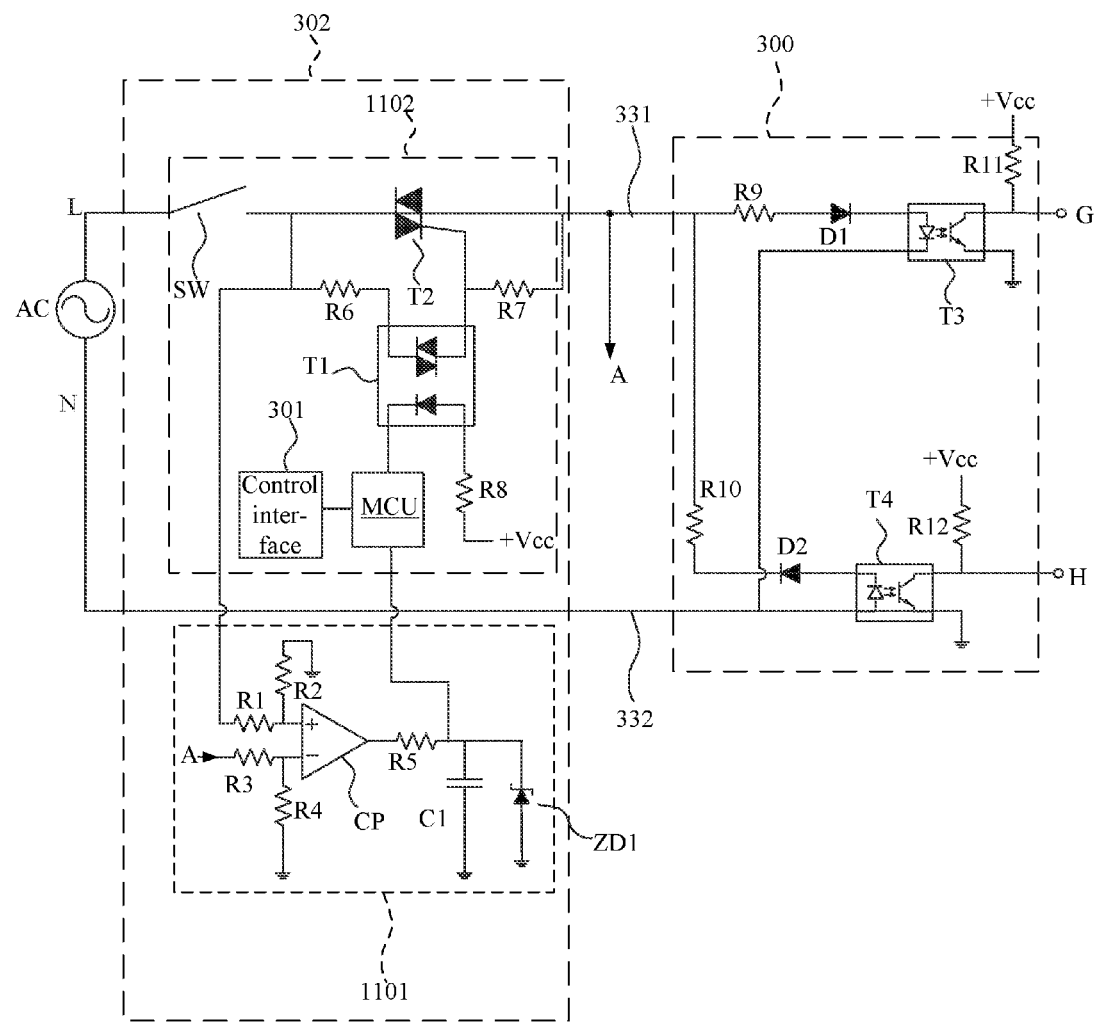
FIG. 13 illustrates a detail circuit diagram depicting the control interface 301, the signal chopping circuit 302 and a part of load circuit 300 of the power line communication control system according to a preferred embodiment of the present invention.

FIG. 13 illustrates a detail circuit diagram depicting the control interface 301, the signal chopping circuit 302 and a part of load circuit 300 of the power line communication control system according to a preferred embodiment of the present invention. Referring to FIG. 11 and FIG. 13, in order to operate the circuit with single wire, the circuit in FIG. 11 is modified to the circuit in FIG. 13. The difference between the circuit in FIG. 11 and the circuit in FIG. 13 is that the resistor R3 connected to the negative input terminal of the comparator CP is coupled to the node A. The operation waveform of FIG. 13 is the same as that of FIG. 12. Since the operation of the circuit in FIG. 13 is analogue to that in FIG. 11, the detail description is omitted.

In summary, the spirit of the present invention is to utilize the AC signal on the AC power line to control the load circuit. The load circuit can determines whether the received AC signal represents the logic "1" or "0" according to the waveform of the AC signal. Therefore, the system is exempted from increasing wiring settings of extra control circuit between the load circuit and power source. Further, it is also exempted from the annoyance by switching the lamp switch for control of the level of the load circuit.

While the invention has been described by way of examples and in terms of preferred embodiments, it is to be understood that the invention is not limited thereto. To the contrary, it is intended to cover various modifications. Therefore, the scope of the appended claims should be accorded the broadest interpretation so as to encompass all such modifications.

What is claimed is:

1. A power line communication control system, adapted for single-wire, coupled between a first AC terminal and a second AC terminal, for receiving a sinusoidal AC signal from the first AC terminal and changing a positive half cycle and a negative half cycle of the sinusoidal AC signal to obtain a phase chopping signal according to a user's operation, wherein the power line communication control system comprises:
    a load circuit, receiving the phase chopping signal, for determining a logic according to a positive half cycle and a negative half cycle of the phase chopping signal; and
    a signal chopping circuit, coupled to the first AC terminal, the second AC terminal and the load circuit, wherein the signal chopping circuit adjusts the positive half cycle and the negative half cycle of the sinusoidal AC signal according to a digital data to be transmitted to the load circuit,
    wherein the signal chopping circuit is used for chopping the positive half cycle and the negative half cycle of the sinusoidal AC signal to obtain the phase chopping signal, wherein an off time of the positive half cycle of the phase chopping signal is equal to an off time of the negative half cycle of the phase chopping signal when the digital data is a first logic, wherein the off time of the positive half cycle of the phase chopping signal is not equal to the off time of the negative half cycle of the phase chopping signal when the digital data is a second logic.

2. The power line communication control system according to claim 1, wherein the signal chopping circuit comprises:
    a AC period detector, comprising a first input terminal, a second input terminal and an output terminal, wherein the first input terminal of the AC period detector is coupled to the first AC terminal, the second input terminal of the AC period detector is coupled to the second AC terminal, and the output terminal of the AC period detector is for outputting a period detecting square wave, wherein a period of the period detecting square wave is the same as a period of the sinusoidal AC signal; and
    a phase cutting circuit, comprising an input terminal and an output terminal, wherein the input terminal of the phase cutting circuit is coupled to the first AC terminal, wherein the phase cutting circuit receives the period detecting square wave to determine the period of the sinusoidal AC signal, and the phase cutting circuit chops the sinusoidal AC signal to output the phase chopping signal according to the period of the sinusoidal AC signal and the user's operation.

3. The power line communication control system according to claim 2, wherein the phase cutting circuit comprises:
    a tri-electrode AC (TRIAC) switch, comprising an input terminal, an output terminal and a control terminal, wherein the input terminal of the TRIAC switch is coupled to the first AC terminal;
    a first current limiting resistor, comprising a first terminal and a second terminal, wherein the first terminal of the first current limiting resistor is coupled to the first AC terminal;
    a photo-coupler, comprising a first control terminal, a second control terminal, a first output terminal and a second output terminal, wherein the first output terminal of the photo-coupler is coupled to the first AC terminal, the second output terminal of the photo-coupler is coupled to the control terminal of the TRIAC switch, the second control terminal of the photo-coupler is coupled to a logic high voltage; and
    a microprocessor, coupled to the first control terminal of the photo-coupler, wherein the microprocessor determines the phase of the sinusoidal AC signal according to the received period detecting square wave, and outputs a low voltage pulse according to the phase of the period detecting square wave and the user's operation, such that the output terminal of the TRIAC switch outputs the phase chopping signal.

4. The power line communication control system according to claim 2, wherein the AC period detector comprises:
    a first voltage divider, comprising an input terminal and an output terminal, wherein the input terminal of the first voltage divider is coupled to the first AC terminal, wherein the output terminal of the first voltage divider outputs a first divided voltage, wherein the first divided voltage is proportional to a voltage of the first AC terminal;
    a second voltage divider, comprising an input terminal and an output terminal, wherein the input terminal of the second voltage divider is coupled to the second AC terminal, wherein the output terminal of the second voltage divider outputs a second divided voltage, wherein the second divided voltage is proportional to a voltage of the second AC terminal;
    a comparator, comprising a first input terminal, a second input terminal and an output terminal, wherein the first input terminal of the comparator is coupled to the output terminal of the first voltage divider, and the second input terminal of the comparator is coupled to the output terminal of the second voltage divider; and
    a filtering circuit, comprising an input terminal and an output terminal, wherein the input terminal of the filtering circuit is coupled to the output terminal of the comparator, and the output terminal of the filtering circuit is coupled to the output terminal of the AC period detector; and a voltage limiter circuit, comprising a first terminal and a second terminal, wherein the first terminal of the voltage limiter circuit is coupled to the output terminal of the AC period detector, and the second terminal of the voltage limiter circuit is coupled to a common voltage.

5. The power line communication control system according to claim 4, wherein the first voltage divider comprises:
a first voltage dividing resistor, comprising a first terminal and a second terminal, wherein the first terminal of the first voltage dividing resistor is coupled to the first AC terminal; and
a second voltage dividing resistor, comprising a first terminal and a second terminal, wherein the first terminal of the second voltage dividing resistor is coupled to the second terminal of the first voltage dividing resistor and the second terminal of the second voltage dividing resistor is coupled to the common voltage;
wherein the second voltage divider comprises:
a third voltage dividing resistor, comprising a first terminal and a second terminal, wherein the first terminal of the third voltage dividing resistor is coupled to the second AC terminal;
a fourth voltage dividing resistor, comprising a first terminal and a second terminal, wherein the first terminal of the fourth voltage dividing resistor is coupled to the second terminal of the third voltage dividing resistor, and the second terminal of the fourth voltage dividing resistor is coupled to the common voltage.

6. The power line communication control system according to claim 1, wherein the load circuit comprises:
a positive half cycle sampling circuit, comprising:
a first current limiting resistor, comprising a first terminal and a second terminal, wherein the first terminal of the first current limiting resistor receives the phase chopping signal;
a first unidirectional conductive element, comprising a first terminal and a second terminal, wherein the first terminal of the first unidirectional conductive element is coupled to the second terminal of the first current limiting resistor, wherein a current direction of the first unidirectional conductive element is from the first terminal of the first unidirectional conductive element to the second terminal of the first unidirectional conductive element;
a first photo-coupler, comprising a first control terminal, a second control terminal, a first output terminal and a second output terminal, wherein the first control terminal of the first photo-coupler is coupled to the second terminal of the first unidirectional conductive element, the second control terminal of the first photo-coupler is coupled to the second AC terminal, and the second output terminal of the first photo-coupler is coupled to a common voltage; and
a first pull high resistor, comprising a first terminal and a second terminal, wherein the first terminal of the first pull high resistor is coupled to a logic high voltage, and the second terminal of the first pull high resistor is coupled to the first output terminal of the first photo-coupler, wherein a pulse width of a voltage of the second terminal of the first pull high resistor represents the on-time of the positive half cycle of the phase chopping signal; and
a negative half cycle sampling circuit, comprising:
a second current limiting resistor, comprising a first terminal and a second terminal, wherein the first terminal of the second current limiting resistor receives the phase chopping signal;

a second unidirectional conductive element, comprising a first terminal and a second terminal, wherein the first terminal of the second unidirectional conductive element is coupled to the second terminal of the second current limiting resistor, wherein a current direction of the second unidirectional conductive element is from the second terminal of the second unidirectional conductive element to the first terminal of the second unidirectional conductive element;
a second photo-coupler, comprising a first control terminal, a second control terminal, a first output terminal and a second output terminal, wherein the first control terminal of the second photo-coupler is coupled to the second terminal of the second unidirectional conductive element, the second control terminal of the second photo-coupler is coupled to the second AC terminal, and the second output terminal of the second photo-coupler is coupled to the common voltage; and
a second pull high resistor, comprising a first terminal and a second terminal, wherein the first terminal of the second pull high resistor is coupled to a logic high voltage, and the second terminal of the second pull high resistor is coupled to the first output terminal of the second photo-coupler, wherein a pulse width of a voltage of the second terminal of the second pull high resistor represents the on-time of the negative half cycle of the phase chopping signal.

7. The power line communication control system according to claim 1, wherein the signal chopping circuit is disposed in the lamp switch on the wall, and the load circuit is electrically connected to the signal chopping circuit through a first AC signal line disposed in the wall and a second AC signal line, wherein the signal chopping circuit is neighbor to a lamp switch.

8. A power line communication control system, adapted for single-wire, coupled between a first AC terminal and a second AC terminal, for receiving a sinusoidal AC signal from the first AC terminal and changing a positive half cycle and a negative half cycle of the sinusoidal AC signal to obtain a phase chopping signal according to a user's operation, wherein the power line communication control system comprises:
a load circuit, receiving the phase chopping signal, for determining a logic according to a positive half cycle and a negative half cycle of the phase chopping signal; and
a signal chopping circuit, coupled to the first AC terminal, the second AC terminal and the load circuit, wherein the signal chopping circuit adjusts the positive half cycle and the negative half cycle of the sinusoidal AC signal according to a digital data to be transmitted to the load circuit to obtain the phase chopping signal,
wherein a sum of an on-time of the positive half cycle of the phase chopping signal and an on-time of the negative half cycle of the phase chopping signal is greater than a waveform similarity threshold when the digital data is a first logic,
wherein the sum of the on-time of the positive half cycle of the phase chopping signal and the on-time of the negative half cycle of the phase chopping signal is smaller than the waveform similarity threshold when the digital data is a second logic.

9. The power line communication control system according to claim 8, wherein the waveform similarity threshold is 90% of a period of the sinusoidal AC signal, wherein the phase chopping signal represents the first logic when the on-time of the positive half cycle of the phase chopping signal plus the on-time of the negative half cycle of the phase chopping signal is greater than 90% of the period of the sinusoidal AC signal, wherein the phase chopping signal represents the second logic when the on-time of the positive half cycle of the phase chopping signal plus the on-time of the negative half cycle of the phase chopping signal is smaller than 90% of the period of the sinusoidal AC signal.

10. A power line communication control system, adapted for single-wire, coupled between a first AC terminal and a second AC terminal, for receiving a sinusoidal AC signal from the first AC terminal and changing a positive half cycle and a negative half cycle of the sinusoidal AC signal to obtain a phase chopping signal according to a user's operation, wherein the power line communication control system comprises:

a load circuit, receiving the phase chopping signal, for determining a logic according to a positive half cycle and a negative half cycle of the phase chopping signal; and a signal chopping circuit, coupled to the first AC terminal, the second AC terminal and the load circuit, wherein the signal chopping circuit adjusts the positive half cycle and the negative half cycle of the sinusoidal AC signal according to a digital data to be transmitted to the load circuit to obtain the phase chopping signal, wherein, when the digital data is a first logic, a component of the positive half cycle of the sinusoidal AC signal is chopped, and the negative half cycle of the sinusoidal AC signal is unchanged to obtain the phase chopping signal;

wherein, when the digital data is a second logic, a component of the negative half cycle of the sinusoidal AC signal is chopped, and the positive half cycle of the sinusoidal AC signal is unchanged to obtain the phase chopping signal.

11. A power line communication control method, comprising:

receiving a AC voltage from a power line, wherein each period of the AC voltage comprises a positive half cycle and a negative half cycle which form a sinusoidal AC signal; and adjusting the positive half cycle and the negative half cycle of the sinusoidal AC signal according to a digital data to be transmitted to a load circuit, which comprises:

1. setting a waveform similarity threshold;
2. chopping the positive half cycle and the negative half cycle of the sinusoidal AC signal to obtain a phase chopping signal, wherein, when the digital data is a first logic, an on-time of the positive half cycle of the phase chopping signal plus an on-time of the negative half cycle of the phase chopping signal is greater than the waveform similarity threshold;

when the digital data is a second logic, the on-time of the positive half cycle of the phase chopping signal plus the on-time of the negative half cycle of the phase chopping signal is smaller than the waveform similarity threshold.

12. The power line communication control method according to claim 11, wherein the waveform similarity threshold is 90% of a period of the sinusoidal AC signal, wherein, the phase chopping signal represents the first logic when the on-time of the positive half cycle of the phase chopping signal plus the on-time of the negative half cycle of the phase chopping signal is greater than 90% of the period of the sinusoidal AC signal, wherein the phase chopping signal represents the second logic when the on-time of the positive half cycle of the phase chopping signal plus the on-time of the negative half cycle of the phase chopping signal is smaller than 90% of the period of the sinusoidal AC signal.

13. A power line communication control method, comprising:

receiving a AC voltage from a power line, wherein each period of the AC voltage comprises a positive half cycle and a negative half cycle which form a sinusoidal AC signal; and adjusting the positive half cycle and the negative half cycle of the sinusoidal AC signal according to a digital data to be transmitted to a load circuit, which comprises:

chopping the positive half cycle and the negative half cycle of the sinusoidal AC signal to obtain a phase chopping signal, wherein, when the digital data is a first logic, an on-time of the positive half cycle of the phase chopping signal is equal to an on-time of the negative half cycle of the phase chopping signal;

when the digital data is a second logic, the on-time of the positive half cycle of the phase chopping signal is not equal to the on-time of the negative half cycle of the phase chopping signal.

14. A power line communication control method, comprising:

receiving a AC voltage from a power line, wherein each period of the AC voltage comprises a positive half cycle and a negative half cycle which form a sinusoidal AC signal; and adjusting the positive half cycle and the negative half cycle of the sinusoidal AC signal according to a digital data to be transmitted to a load circuit, which comprises:

wherein, when the digital data is a first logic, a component of the positive half cycle of the sinusoidal AC signal is chopped, and the negative half cycle of the sinusoidal AC signal is unchanged to obtain the phase chopping signal;

wherein, when the digital data is a second logic, a component of the negative half cycle of the sinusoidal AC signal is chopped, and the positive half cycle of the sinusoidal AC signal is unchanged to obtain the phase chopping signal.

* * * * *